United States Patent
Gordon

(10) Patent No.: US 11,740,804 B1
(45) Date of Patent: Aug. 29, 2023

(54) SYSTEM AND METHOD FOR PERFORMING DATA STRIPING

(71) Applicant: Lightbits Labs Ltd., Kfar Saba (IL)

(72) Inventor: Abel Alkon Gordon, Sunnyvale, CA (US)

(73) Assignee: LIGHTBITS LABS LTD., Kfar Saba (IL)

( * ) Notice: Subject to any disclaimer, the term of this patent is extended or adjusted under 35 U.S.C. 154(b) by 0 days.

(21) Appl. No.: 17/695,012

(22) Filed: Mar. 15, 2022

(51) Int. Cl.
*G06F 12/00* (2006.01)
*G06F 3/06* (2006.01)

(52) U.S. Cl.
CPC .......... *G06F 3/0619* (2013.01); *G06F 3/067* (2013.01); *G06F 3/0634* (2013.01); *G06F 3/0635* (2013.01); *G06F 3/0659* (2013.01); *G06F 3/0683* (2013.01)

(58) Field of Classification Search
None
See application file for complete search history.

(56) References Cited

U.S. PATENT DOCUMENTS

| | | | |
|---|---|---|---|
| 9,229,901 B1* | 1/2016 | Nesbit | G06F 3/067 |
| 2008/0301254 A1* | 12/2008 | Bestler | H04L 69/166 |
| | | | 709/212 |
| 2018/0039412 A1* | 2/2018 | Singh | G06F 3/067 |
| 2019/0303046 A1* | 10/2019 | Yu | G06F 3/0679 |

\* cited by examiner

*Primary Examiner* — Daniel D Tsui
(74) *Attorney, Agent, or Firm* — PEARL COHEN ZEDEK LATZER BARATZ LLP

(57) ABSTRACT

A system and method for performing data striping and data protection, may include: obtaining, in a network interface controller (NIC) from a host processor, a command to store data in a storage system, wherein the host processor is connected to a network through the NIC;
dividing, by the NIC, the data into a plurality of portions;
mapping, by the NIC, each of the plurality of portions to at least one of a plurality of storage targets, wherein the plurality of storage targets are connected to the NIC over the network; and,
transferring, by the NIC, each of the plurality of portions to the mapped at least one storage target.

19 Claims, 6 Drawing Sheets

SYSTEM AND METHOD FOR PERFORMING DATA STRIPING

FIELD OF THE INVENTION

The present invention relates generally management of a remote storage system. More specifically, the present invention relates to performing data stripping and data protection in a remote storage systems.

BACKGROUND

Data striping is a known technique used to balance capacity and input and output operations rate, referred to as input and output operations per second (IOPs) in storage systems. Data striping may include spreading data across multiple storage devices that form a single storage cluster or volume. By spreading the data across multiple storage devices, all storage devices in a cluster may store similar amount of data and since the storage devices in the cluster may be accessed concurrently, IOPs for a single read or write operation may spread across devices. Thus, data striping may enable clients to have a logical storage volume that can store more capacity than the maximum size of a single storage device with an increased throughput.

One drawback of data striping is that a failure on any of the storage devices may compromise the data of the entire storage cluster. To solve this, redundant information such as parity bits may be stored as well, to protect the data in case a single storage device fails.

Another drawback of data striping is that data striping requires management and may load the host processor if performed by the host processor or increase latencies if performed by a storage target.

RAID controllers may also provide data stripping. However, RAID controllers require dedicated hardware, are not optimized to for solid state drives (SSDs) and typically support local storage devices and not remote storage devices.

SUMMARY

According to embodiments of the invention, a system and method for performing data striping may include obtaining, in a network interface controller (NIC) from a host processor, a command to store data in a storage system, wherein the host processor is connected to a network through the NIC; dividing, by the NIC, the data into a plurality of portions; mapping, by the NIC, each of the plurality of portions to at least one of a plurality of storage targets, wherein the plurality of storage targets are connected to the NIC over the network; and, transferring, by the NIC, each of the plurality of portions to the mapped at least one storage target.

According to embodiments of the invention, the NIC may communicate with the plurality of storage targets over multiple paths, and each of the paths may be one of the list including: non-volatile memory express (NVMe) or NVMe over Fabrics (NVMeOF).

Embodiments of the invention may include implementing, by the NIC, data protection mechanism on the stored data.

Embodiments of the invention may include, in case one of the plurality of storage targets fails, reconstructing lost data transparently from the host processor.

According to embodiments of the invention, reconstructing the lost data may be performed when storage target cannot be accessed.

According to embodiments of the invention, reconstructing the lost data may include: reading, by the NIC, data that is required for the reconstruction from other storage targets of the plurality of storage targets; reconstructing the lost data using the read data; and transferring, by the NIC, the reconstructed data to the host processor.

According to embodiments of the invention, reconstructing the lost data may include: sending, by the NIC, a read-reconstruct command to a selected storage target of the plurality of storage targets; reading, by the selected storage target, data that is required for the reconstruction from other storage targets of the plurality of storage targets; reconstructing, by the selected storage target, the lost data using the read data; transferring, by the selected storage target, the reconstructed data to the NIC; and transferring, by the NIC, the reconstructed data to the host.

Embodiments of the invention may include, notifying, by the NIC, a management software of the failed storage target; obtaining, by the NIC, from the management software an allocation of a new storage target; reconstructing data of the failed storage target on the new storage target; and continuing using the new storage target instead of the failed storage target.

According to embodiments of the invention, reconstructing data of the failed storage target on the new storage target may be performed by the NIC.

According to embodiments of the invention, reconstructing data of the failed storage target on the new storage target may be performed by: sending, by the NIC, a rebuild command to a selected storage target of the plurality of storage targets; reconstructing data of the failed storage target on the new storage target by the selected storage target; and notifying the NIC, by the selected storage target, that the data is reconstructed on the new storage target.

Embodiments of the invention may include, obtaining, by the NIC, a read command from the host processor; retrieving, by the NIC, the portions from the plurality of storage targets; and transferring the portions to the host processor.

BRIEF DESCRIPTION OF THE DRAWINGS

The subject matter regarded as the invention is particularly pointed out and distinctly claimed in the concluding portion of the specification. Embodiments of the invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

Figure 1:
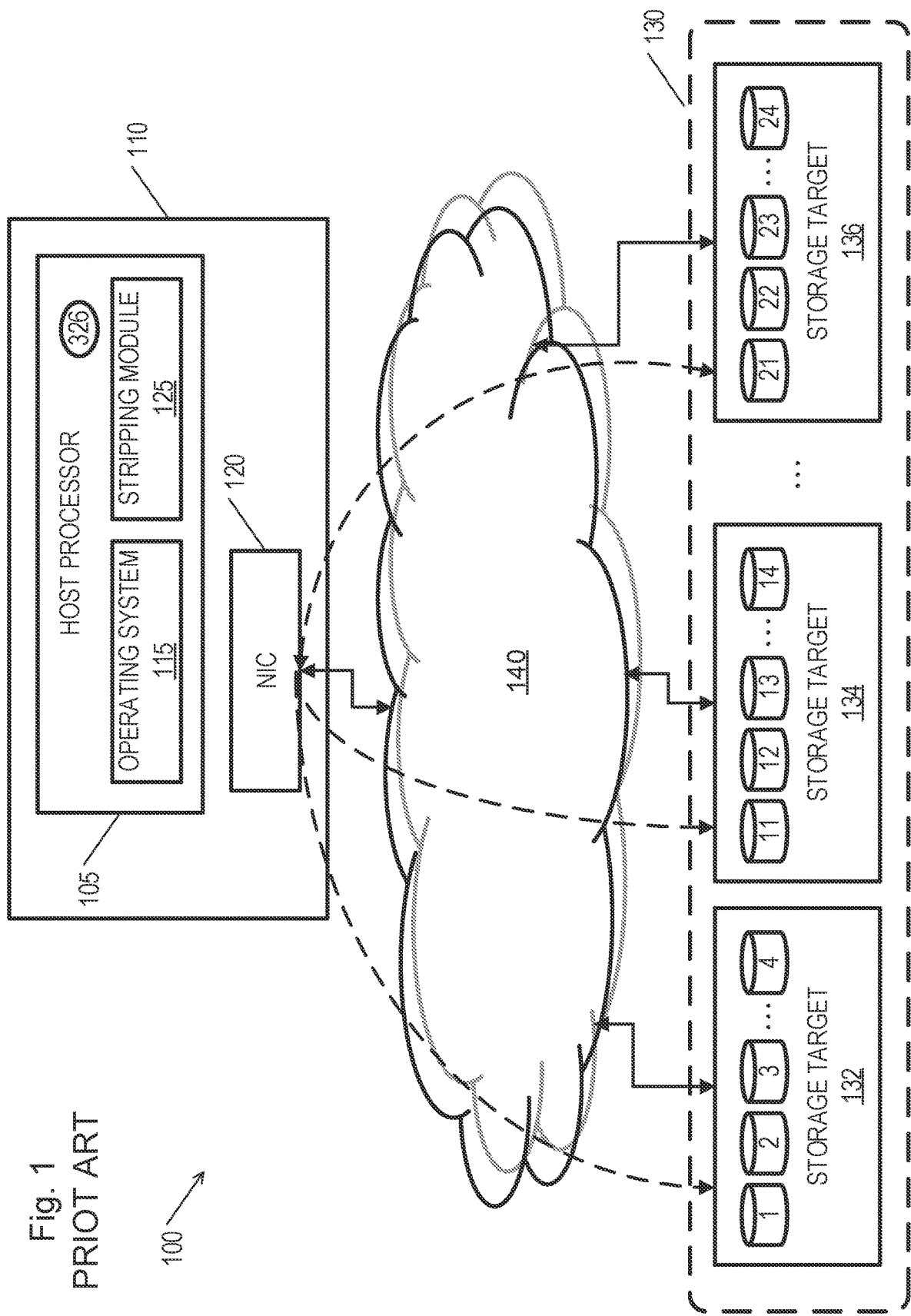
FIG. 1 is a schematic illustration of a first prior art stripped storage system.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION

In the following description, various aspects of the present invention will be described. For purposes of explanation, specific configurations and details are set forth in order to provide a thorough understanding of the present invention. However, it will also be apparent to one skilled in the art that the present invention may be practiced without the specific details presented herein. Furthermore, well known features may be omitted or simplified in order not to obscure the present invention.

Although some embodiments of the invention are not limited in this regard, discussions utilizing terms such as, for example, "processing," "computing," "calculating," "determining," "establishing", "analyzing", "checking", or the like, may refer to operation(s) and/or process(es) of a computer, a computing platform, a computing system, or other electronic computing device that manipulates and/or transforms data represented as physical (e.g., electronic) quantities within the computer's registers and/or memories into other data similarly represented as physical quantities within the computer's registers and/or memories or other information transitory or non-transitory or processor-readable storage medium that may store instructions, which when executed by the processor, cause the processor to execute operations and/or processes. Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. The term "set" when used herein may include one or more items unless otherwise stated. Unless explicitly stated, the method embodiments described herein are not constrained to a particular order or sequence. Additionally, some of the described method embodiments or elements thereof can occur or be performed in a different order from that described, simultaneously, at the same point in time, or concurrently.

FIG. 1 is a schematic illustration of a first prior art stripped storage system 100 incorporating storage targets 132, 134 and 136 that form storage cluster or volume 130. In prior art system 100, data stripping is performed by processor 125, e.g., managed by striping module 125 that may include software executed by host processor 125. Striping module 125 may divide each write operation, e.g., a write operation initiated by operating system 115 or other applications executed by host processor 105, to a plurality of write operations, each intended to one of the plurality of storage targets 132, 134 and 136. For example, data 326 of a single write operation may be divided into a plurality of segments 1, 11 and 21, each stored on a different storage target 132, 134 and 136, respectively. Similarly, a single read operation may require reading a plurality of segments, each from one of storage targets 132, 134 and 136. Storage targets 132, 134 and 136 may be remote to host 110, e.g., accessed over a network. In some embodiments storage targets 132, 134 and 136 may be implemented in the cloud.

Host 110 and storage targets 132, 134 and 136 may be interconnected through network or networks 140. Network 140 may include any type of network or combination of networks available for supporting communication between host 110 and storage targets 132, 134 and 136. Networks 140 may include for example, a wired, wireless, fiber optic, or any other type of connection, a local area network (LAN), a wide area network (WAN), the Internet and intranet networks, etc. Host 110 may be connected to network 140 though network interface card or controller (NIC) 120 and may communicate with storage targets 132, 134 and 136 over network 140 and though NIC 120. Some or all of host 110 and storage targets 132, 134 and 136 may be directly connected.

The main disadvantage of volume stripping in the prior art implementation presented in FIG. 1, is that it requires host processor 105 to be aware of the existence of many logical and/or physical storage targets 132, 134 and 136, spread the data evenly across storage targets 132, 134 and 136, maintain the redundant protection information and rebuild the data in case of a failure of one of storage targets 132, 134 and 136. Such processes may require precious cycles of host processor 125. In addition, the host processor 125 may require some meta-information to know how to compose the logical striped volume from the parts of stripes stored on many storage targets. This meta-information may have to be stored persistently by host 110.

Figure 2:
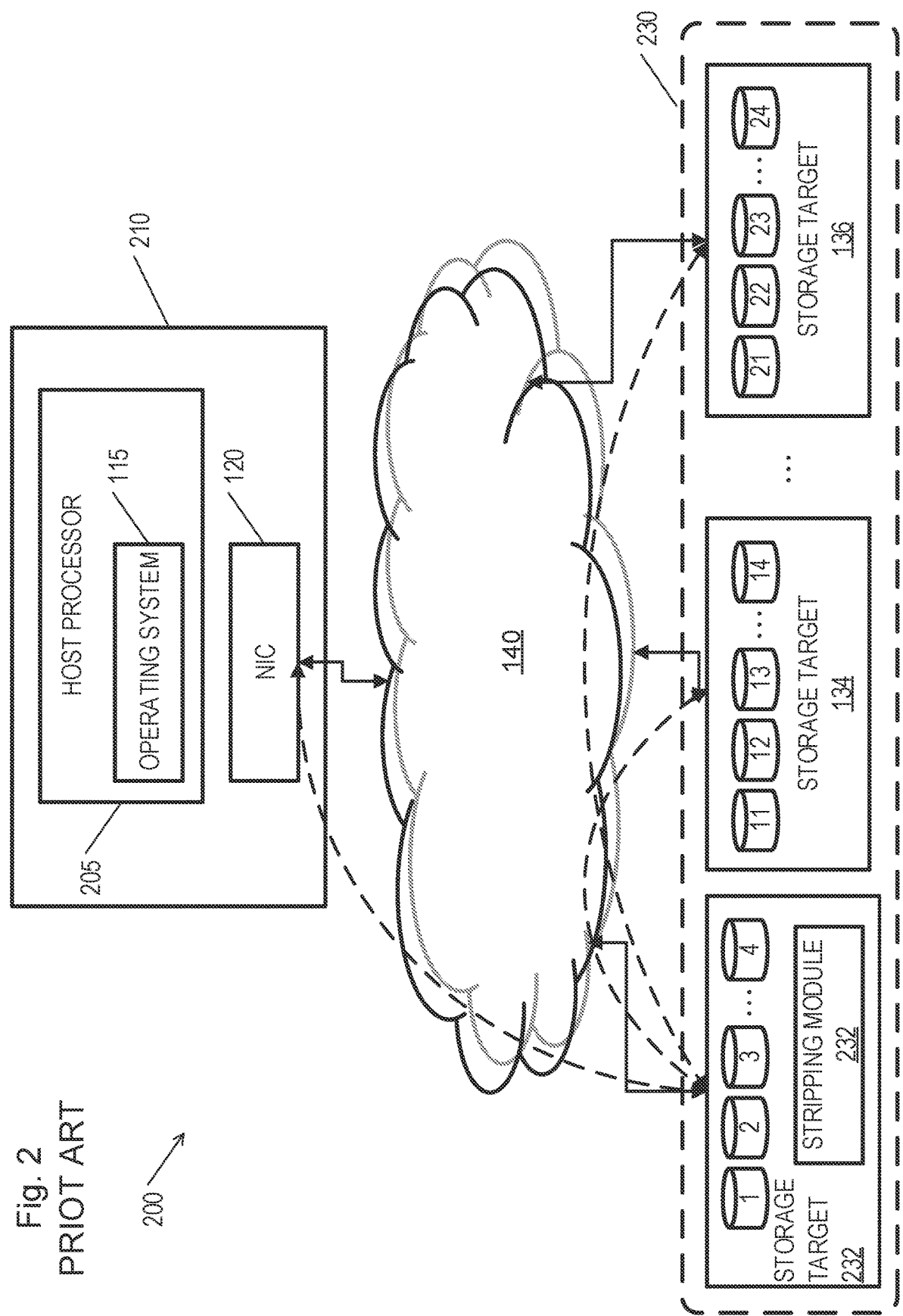
FIG. 2 is a schematic illustration of a second prior art stripped storage system.

FIG. 2 is a schematic illustration of a second prior art stripped storage system 200 incorporating storage targets 232, 134 and 136 that form storage cluster or volume 230. In prior art system 200, data stripping is performed by storage target 232. In this implementation, storage target 232 may receive all the read and write requests sent by host 210 and then spread them over network 140 to multiple storage targets 134 and 136 in storage cluster 230. The implementation of storage system 200 may offload host processor 205, in comparison to host processor 105, but may increase read and write latencies since data may have to travel twice through network 140. In addition, storage target 232, acting as a gateway handling all data read and written to cluster 230 may be overloaded.

Embodiments of the invention may provide a data striping system and method that would offload the host processor and not increase latency of the storage target. According to embodiments of the invention, data stripping may be implemented by the NIC. The host processor may issue read and write request to a logical storage device exposed by the NIC to the operating system, as if the host processor was communication with a single local storage device. The NIC may obtain the read and write requests, may perform all the required operations related to data stripping, e.g., in a write operation the NIC may divide or split the chunk of data of the write request into portions or segments of data, transmit the segments of data to a plurality of storage targets over a network, and perform all actions required for data protection, e.g., parity calculations, or data protection as required by RAID 5, or 6 standards. In a read request, the NIC may read the plurality of data portions or segments from the plurality of storage targets and provide the required data to the host processor. In case of a failure of one of the storage targets, the NIC may perform the operations required for data reconstruction.

Thus, the NIC may expose a single virtual and local storage device to the host processor and by this may offload the processor from all the operations required for data stripping. In addition, since the NIC may send and receive all data segments to and from the allocated storage targets, no retransmission of data over the network may be required. The operating system or hypervisor of the host processor may operate as if it has a locally attached storage device, may issue read and write requests to that virtual local storage device, and may be substantially ignorant to the data stripping process and to the fact the actual storage targets are remote, e.g., accessed over a network. In addition to reducing the load of data stripping and data protection from the host processor without increasing latency, embodiments of the invention may provide greater flexibility and compatibility since the data striping and data protection would operate without any special requirements from the host processor and regardless of what type of operating system or hypervisor the host processor runs. In addition, embodiments of the invention may provide further acceleration of the data stripping and data protection process comparing to performing the data stripping and data protection by the host processor since the NIC may utilize special or dedicated accelerators for data stripping and data protection.

Embodiments of the invention may perform the operation of the computer itself and of data storage systems by providing data stripping and data protection without loading the host processor and without increasing the storage latency.

Figure 3:
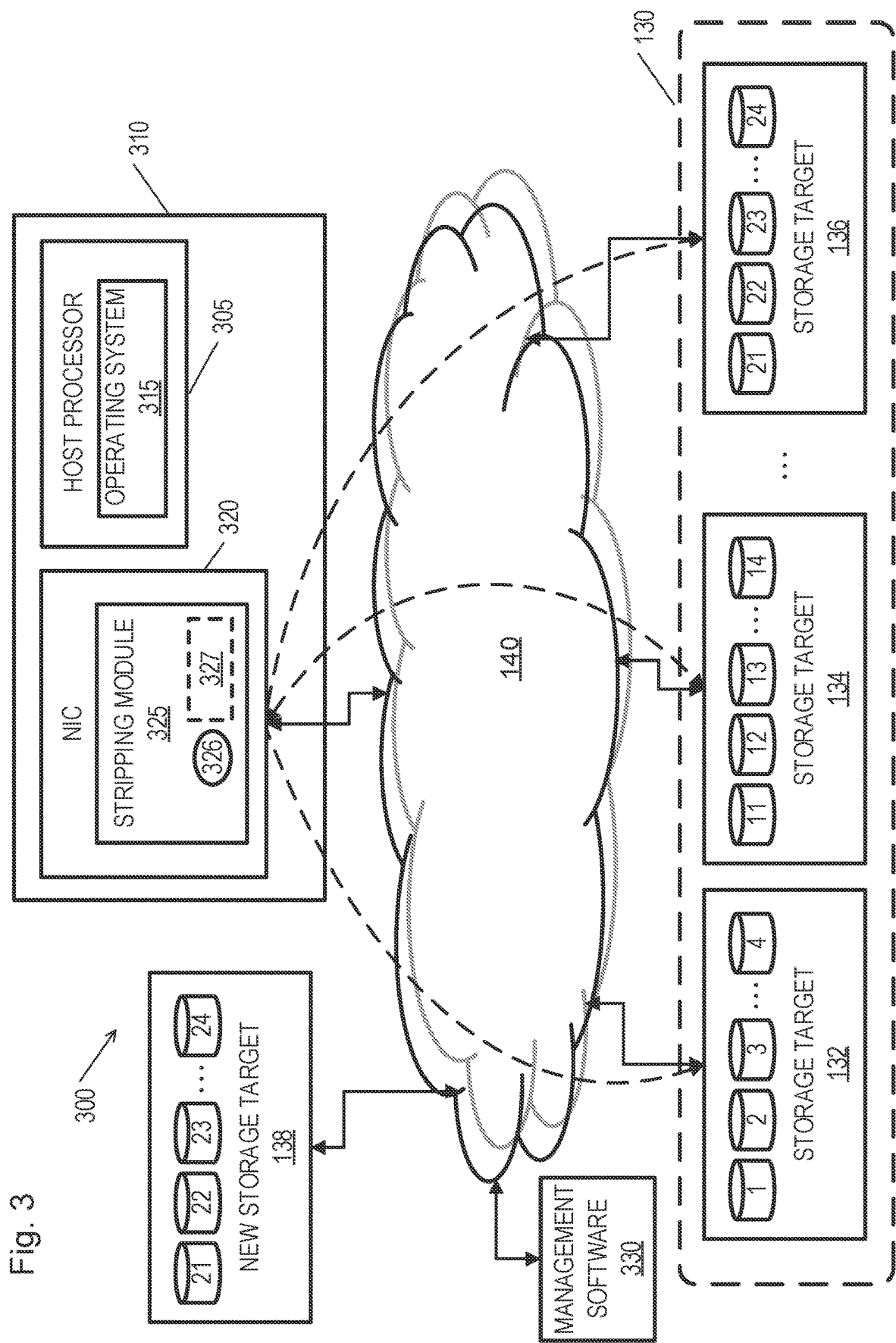
FIG. 3 is a schematic illustration of an improved stripped storage system, according to embodiments of the invention.

Reference is now made to FIG. 3 which is a schematic illustration of an improved stripped storage system 300 according to embodiments of the invention. According to embodiments of the invention, stripped storage system 300 may include a host 310 including a host processor 305 and a NIC 320. Stripped storage system 300 may further include storage targets 132, 134 and 136 that form storage cluster 130. Host 310 may communicate with storage targets 132, 134 and 136 over network 140 through NIC 320. According to embodiments of the invention, NIC 320 may include stripping module 325 that may include or may be implemented by hardware, e.g., by accelerators, a logic design, programmable logic, processors, integrated circuits (IC), application-specific integrated circuits (ASIC), field-programmable gate arrays (FPGA), system-on-chips (SoC), and software, configured to handle data stripping as disclosed herein.

Host processor 305 may be or include one or more processors, co-located or distributed, that may be, for example, a central processing unit processor (CPU), a chip or any suitable computing or computational device. Operating system or hypervisor 315 may be or may include any code segment designed and/or configured to perform tasks involving coordination, scheduling, arbitration, supervising, controlling or otherwise managing operation of host processor 305, for example. Operating system 315 may be a commercial operating system. Operating system 315 may be or may include any code segment designed and/or configured to provide a virtual machine, e.g., an emulation of a computer system. Operating system 315 may initiate read and write operations from a logical storage device 327 exposed by NIC 320, and issue those read and write commands to NIC 320.

Each of storage targets 132, 134 and 136 may be or may include, one or more storage devices. The storage devices may be, for example, a hard disk drive, a non-volatile storage, a flash memory, an SSD, a floppy disk drive, a Compact Disk (CD) drive, a CD-Recordable (CD-R) drive, a universal serial bus (USB) device or other suitable removable and/or fixed storage unit. Each of storage targets 132, 134 and 136 may include one or more types of non-volatile block storage, e.g., non-volatile dual in-line memory module (NVDIMM), non-volatile random-access memory (NVRAM), 3DXpoint storage devices (e.g., Optane®), etc., and non-volatile storage, e.g., NAND flash-based storage. NAND flash-based storage may include any combination of single level cells (SLC) that allow storage of a single data bit per memory cell, multiple level cells (MLC) that allow storage of two data bits per each memory cell, triple level cells (TLC), quadruple level cells (QLC) and penta-level cells (PLC) that allow storage of three, four and five bits per memory cell respectively, hard disk drive (HDD), etc. Other devices and technologies may be used.

NIC 320 may include a computer hardware and software that connects host processor 305 to network 140 and supports the required physical layer and data link layer standard of network 140. NIC 320 may perform various network interface functionalities such as multiple receive and transmit queues, partitioning into multiple logical interfaces, network traffic processing, etc. NIC 320 may include accelerators, processing units and programmable logic to implement various functionalizes, for example, for performing data striping as disclosed herein. As noted, NIC 320 may further include stripping module 325.

According to embodiments of the invention, stripping module 325, that is part of NIC 320, may obtain from host processor 305 a write command, e.g., a command to store data 326 in a storage system or a storage device 327. Stripping module 325 may perform the series of operations required to implement data stripping and data protection, including dividing the data 326 associated with the write command into a plurality of portions or segments of data 1, 11 and 21, mapping each of the plurality of portions of data 1, 11 and 21 to at least one of a plurality of storage targets 132, 134 and 136, and transmitting, sending or transferring each of the plurality of portions of data 1, 11 and 21 to the mapped at least one storage target 132, 134 and 136, respectively.

According to embodiments of the invention, stripping module 325 may obtain from host processor 305 a read command, e.g., a command to retrieve data 326 from the storage system or storage device 327. Stripping module 325 may perform the series of operations required to read the stripped data, including reading or retrieving segments or portions 1, 11 and 21, from storage targets 132, 134 and 136, reconstruct the requested data 326 from segments or portions 1, 11 and 21 and sending or transferring data 326 to host processor 305.

Thus, stripping module 325 may expose a single logical storage device 327 to host processor 305 over a selected communication standard, e.g., non-volatile memory express (NVMe) over peripheral component interconnect express (PCIe). Stripping module 325 may create or implement a striped storage device (volume) and may communicate with the multiple storage targets 132, 134 and 136 over a communication protocol, e.g., NVMe or NVMe over Fabrics (NVMeOF) over transmission control protocol (TCP). Stripping module 325 may access storage targets 132, 134 and 136 over multiple paths, e.g., by implementing asymmetric namespace access (ANA). In some embodiments, stripping module 325 may create or implement a data storage virtualization technology and/or a data protection mechanism on the data stored in storage cluster 130, such as included in redundant array of independent disks (RAID), e.g., RAID 5 or 6, although other forms of storage virtualization and/or data protection on top of the data stripping are also possible. Stripping module 325 may store meta-information that is required to know how to compose the logical striped volume from the parts of stripes stored on storage targets 132, 134 and 136 in any one of storage targets 132, 134 and 136 or elsewhere.

According to embodiments of the invention, stripping module 325 may reconstruct lost data transparently from host processor 305 in case one of the plurality of storage targets 132, 134 and 136 fails. For example, reconstruction may be performed according to RAID 5 or 6 or other data reconstructed standard or method. For example, stripping module 325 may reconstruct lost data upon obtaining a request to read data from the filed storage target. For example, assuming that storage target 136 has filed and that stripping module 325 obtains from host processor 305 a read command, e.g., a command to retrieve data 326. Due to the data stripping, segments 1, 11 and 21 of data 326 are stored in storage targets 132, 134 and 136, respectively. Thus, stripping module 325 may read segment 1 from storage target 132 and segment 2 from storage target 134. However, stripping module 325 may fail to read data segment 21 from in storage target 136. Thus, stripping module 325 may reconstruct segment 21 that is now lost.

According to some embodiments of the invention, to reconstruct the lost data, stripping module 325 may read data that is required for the reconstruction from other storage target of the plurality of storage targets. For example, in case of a failure in storage target 136, stripping module 325 may read data that is required for the reconstruction from storage targets 132 and 134. The data that is required for the reconstruction may be previously stored by stripping module 325 in storage targets 132 and 134, e.g., as part of performing the write operation. After reading the data that is required for the reconstruction, stripping module 325 may reconstruct the lost data, e.g., reconstruct segment 21, using the read data, and may send the reconstructed data, e.g., send reconstructed segment 21 together with segments 1 and 11 to host processor 305.

According to some embodiments of the invention, to reconstruct the lost data, stripping module 325 may send a read-reconstruct command to a selected storage target of the plurality of storage target, e.g., to storage target 132. Storage target 132 may read the data that is required for the reconstruction from other storage targets, may reconstruct the lost data, e.g., reconstruct segment 21, using the read data and send the reconstructed data to stripping module 325 that may send the reconstructed data, e.g., send reconstructed segment 21 together with segments 1 and 11, to the host processor 305.

According to some embodiments of the invention, upon detecting a failure of one of storage targets 132, 134 and 136, stripping module 325 may notify a management software 330 of the failed storage target 136. Management software 330 may allocate a new storage target 138 to replace the failed storage target 136 and may provide the allocation to stripping module 325. The stripping module 325 may obtain the allocation of the segments in a new storage target 138 and may reconstruct the data of the failed storage target 136 on the new storage target 138. Stripping module 325 may continue using the new storage target 138 instead of the failed storage target 136. Management software 330 may be operated by one of storage volume 130 or elsewhere.

According to some embodiments of the invention, reconstructing data of the failed storage target 136 on the new storage target 138 may be performed by a selected storage target. For example, stripping module 325 may send a rebuild command to the selected storage target. The selected storage target may reconstruct the data segments of the failed storage target 136 on the new storage target 138 and may notify stripping module 325 that the data is reconstructed on the new storage target 138.

Figure 4:
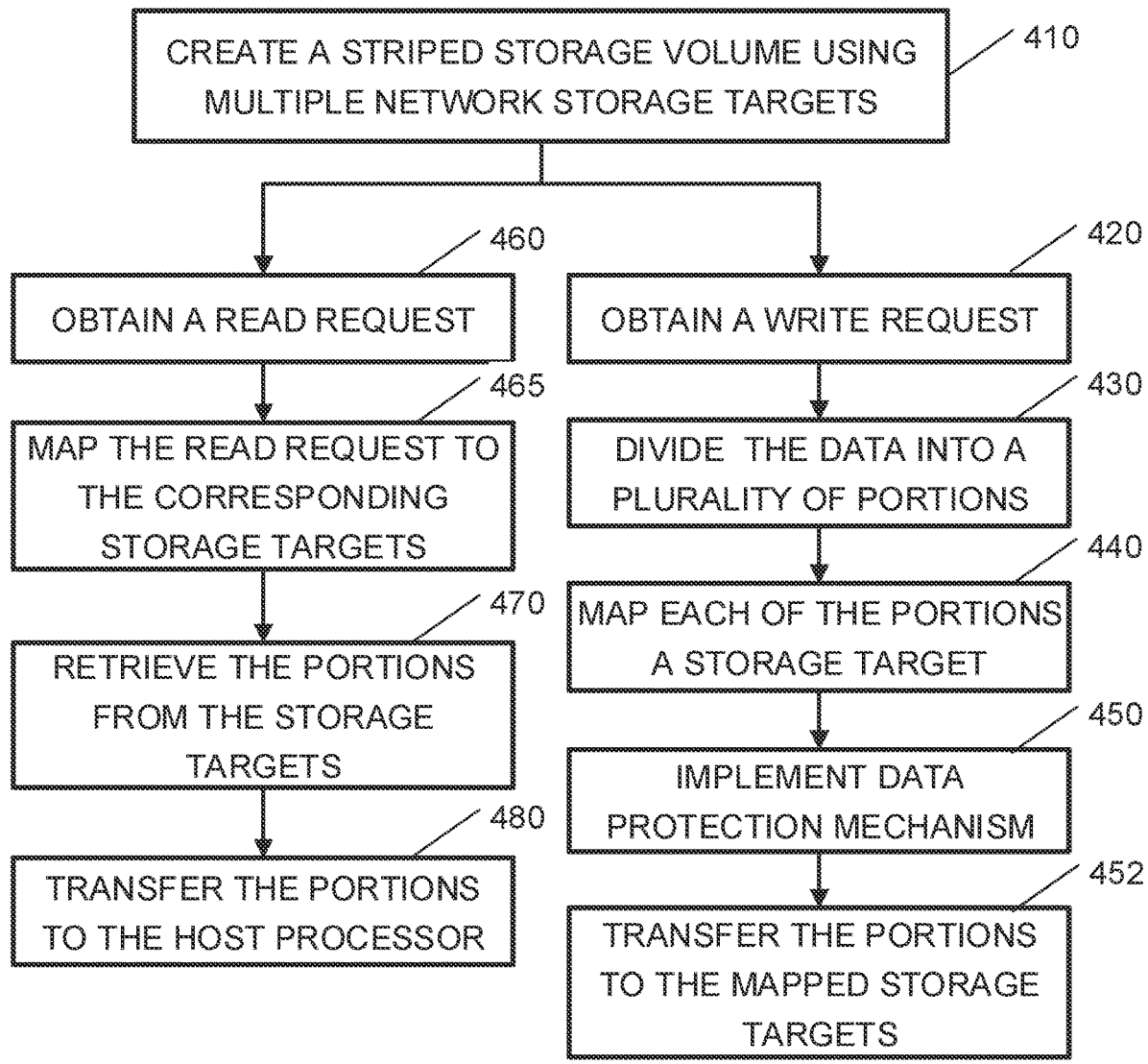
FIG. 4 is a flowchart of a method for performing data striping, according to embodiments of the invention.

Reference is made to FIG. 4, which is a flowchart of a method for performing data striping according to embodiments of the invention. An embodiment of a method for performing data striping may be performed, for example, by the system shown in FIG. 3, or alternatively by another system. An embodiment of a method for performing data striping may be performed for example by logic in a NIC (e.g., stripping module 325 in NIC 320) connecting a host processor (e.g., processor 305) to a network (e.g., network 140).

In operation 410, the NIC, may create a striped storage device (e.g., logical storage device 327) using multiple network storage target (e.g., storage targets 132, 134 and 136). For example, the NIC logic may obtain a request to generate the striped storage device, e.g., from management software 330. For example, the request may include specification of storage targets 132, 134 and 136 that should be included in the striped storage device, and other details as required. The NIC logic may create a striped storage device according to the request. The NIC logic may expose a local storage device, e.g., using NVMe PCIe communications interface, to an operating system or hypervisors of a host processor (e.g., processor 305). The stripping module 325 may create or implement stripping according to a RAID standard, e.g., RAID 5 or 6 or other forms of striping on top of the striped storage device.

In operation 420, the NIC may obtain from the host processor a command to store data in a storage system, e.g., the local storage device exposed to the host processor in operation 410. For example, the NIC may obtain from the host processor a command to store data 326 in a storage system. In operation 430, the NIC may divide the data into a plurality of portions or segments of data. for example, the NC may divide data 326 into a plurality of portions or segments 1, 11 and 21. In operation 440, the NIC may map each of the plurality of portions to at least one of a plurality of storage targets. For example, the NIC may map portion 1 to storage target 132, portion 11 to target device 134, and portion 21 to storage target 136. The storage targets may be remote, e.g., connected to the NIC over the network. In operation 450, the NIC may implement data protection mechanism on the stored data, e.g., by storing parity bits or other data useful for data reconstruction. In operation 452, the NIC may send or transfer or send each of the plurality of portions or segments to the mapped at least one storage target. For example, the NIC may transfer portion 1 to storage target 132, portion 11 to storage target 134, and portion 21 to storage target 136.

In operation 460, the NIC may obtain a read command from the host processor. For example, the NIC may obtain a command to read data 326. In operation 465, the NIC may map the read request to the corresponding storage targets, e.g., demine in which storage targets 132, 134 and 146 portions of the requested data are stored. In operation 470, the NIC may retrieve or read the portions of data from the plurality of storage targets. For example, the NIC may retrieve portion 1 from storage target 132, portion 11 from storage target 134, and portion 21 from storage target 136. In operation 460, the NIC may transfer, send or provide the portions to the host processor, e.g., the NIC may unify the portions and provide the requested data to the host processor. For example, the NIC may unify the portions 1, 11 and 21 to obtain data 326, and may transfer data 326 to the host processor.

Figure 5:
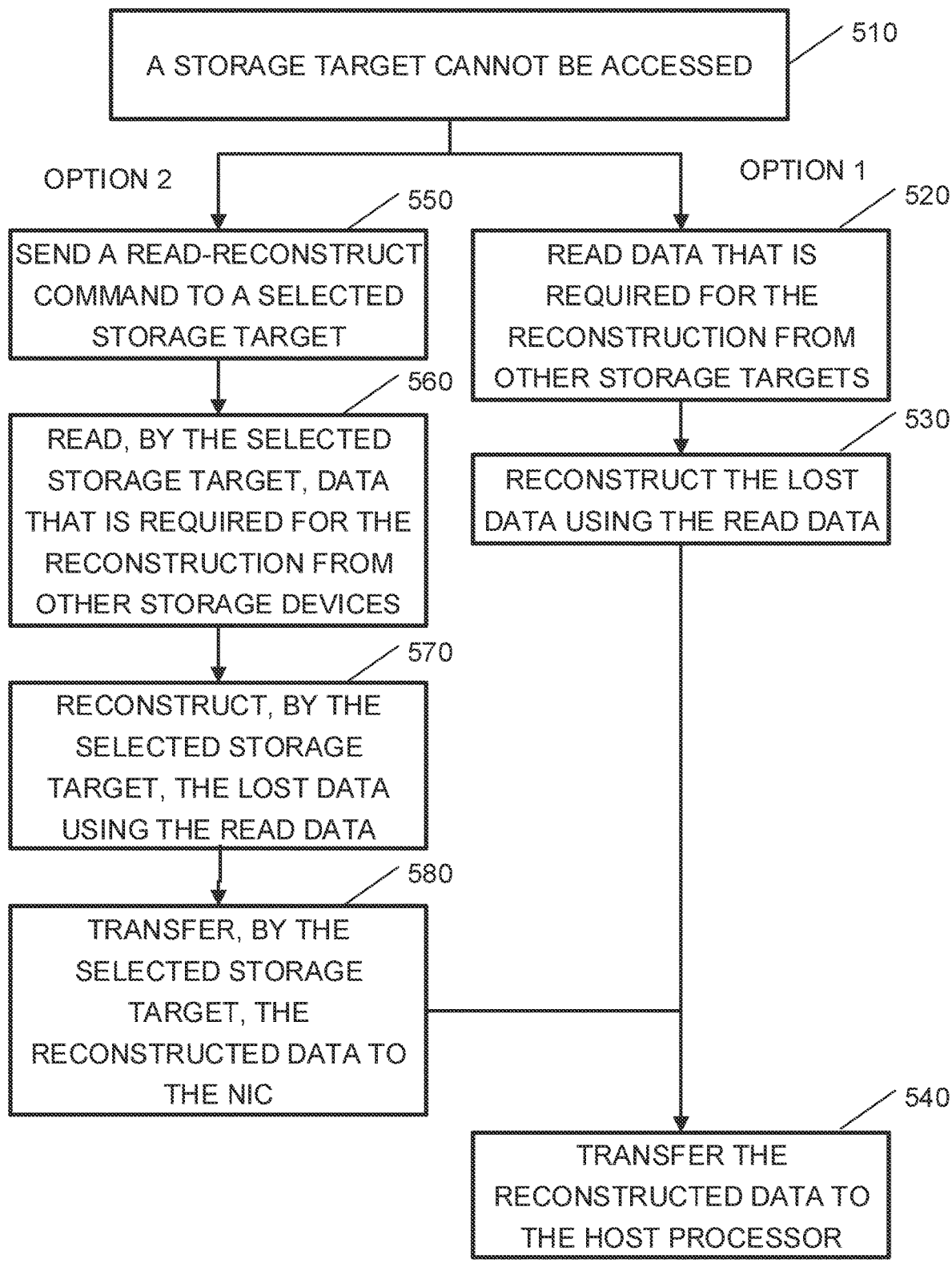
FIG. 5 is a flowchart of a method for reconstructing lost data, according to embodiments of the invention.

Reference is made to FIG. 5, which is a flowchart of a method for reconstructing lost data according to embodiments of the invention. An embodiment of a method for reconstructing lost data may be performed, for example, by the system shown in FIG. 3, or alternatively by another system. An embodiment of a method for reconstructing lost data may be performed for example by logic in a NIC (e.g., stripping module 325 in NIC 320) connecting a host processor (e.g., processor 305) to a network (e.g., network 140), by logic in a storage target, or by other logic.

In operation 510, one of the storage targets in the striped storage device may have a failure and may not be accessible by the NIC. For example, the NIC may try to retrieve data from a storage target and may not obtain the requested data. According to embodiments of the invention, two options for reconstructing the data may be implemented, the first option including operations 520-540 and a second option including operations 550-580 and 540.

First option: in operation 520, the NIC may read data that is required for the reconstruction from other storage targets of the plurality of storage targets, e.g., storage targets other than the failed storage target. For example, the NIC may read data that was stored in the other storage targets by the protection mechanism performed in operation 450. In operation 530, the NIC may reconstruct the lost data using the read data. In operation 540, the NIC may transfer the reconstructed data to the host processor.

Second option: in operation 550, the NIC may send a read-reconstruct command to a selected storage target of the plurality of storage targets, e.g., a storage target other than the failed storage target. In operation 560, the selected storage target may read data that is required for the reconstruction from other storage targets, e.g., storage targets other than the failed storage target. For example, selected storage target may read data that was stored in the other storage targets by the protection mechanism performed in operation 450. In operation 570, the selected storage target may reconstruct the lost data using the read data. In operation 580, the selected storage target may transfer the reconstructed data to the NIC. In operation 540, the NIC may transfer the reconstructed data to the host processor.

Figure 6:
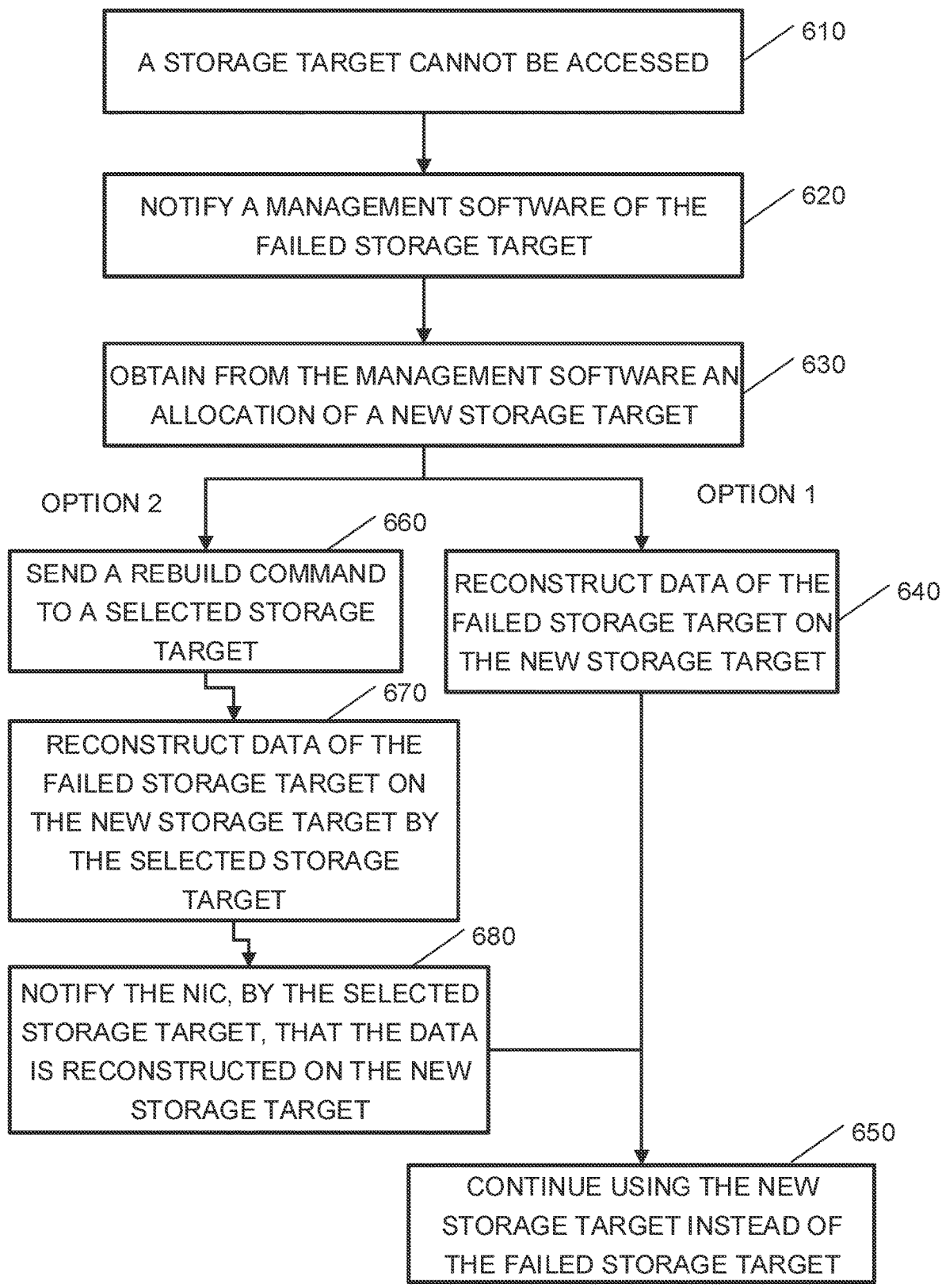
FIG. 6 is a flowchart of a method for reconstructing data of the failed storage target, according to embodiments of the invention.

Reference is made to FIG. 6, which is a flowchart of a method for reconstructing data of the failed storage target according to embodiments of the invention. An embodiment of a method for reconstructing data of the failed storage target may be performed, for example, by the system shown in FIG. 3, or alternatively by another system. An embodiment of a method for reconstructing data of the failed storage target may be performed for example by logic in a NIC (e.g., stripping module 325 in NIC 320) connecting a host processor (e.g., processor 305) to a network (e.g., network 140), by logic in a storage target, or by other logic.

In operation 610, one of the storage targets in the striped storage device may not be accessed by the NIC. For example, the NIC may try to transfer or retrieve data to or from a storage target, or to otherwise communicate with the storage target, and may not obtain any acknowledgement indicating that the storage target is functional. Thus, it may be concluded that the storage target has failed. In operation 620, the NIC may notify a management software of the failed storage target. In operation 630, the NIC may obtain from the management software an allocation of a new storage target.

According to embodiments of the invention, two options for reconstructing the data of the failed storage target may be implemented, the first option including operations 640-650 and a second option including operations 660-680 and 650.

First option: in operation 640, the NIC may reconstruct data of the failed storage target on the new storage target. For example, the data may be reconstructed as supported in RAID 5 and 6 standards, however other data reconstruction methods may be used. in some embodiments, the lost data may be reconstructed using data that was stored in the other storage targets by the protection mechanism performed in operation 450. In operation 650, the NIC may continue using the new storage target instead of the failed storage target.

Second option: in operation 660, the NIC may send a rebuild command to a selected storage target of the plurality of storage target in the storage cluster. In operation 670, the selected storage target may reconstruct data of the failed storage target on the new storage target. For example, the selected storage target may read data that was stored in the other storage targets by the protection mechanism performed in operation 450 and use the read data for the reconstruction of the lost data. In operation 680, the selected storage target may notify the NIC that the data is reconstructed on the new storage target. In operation 650, the NIC may continue using the new storage target instead of the failed storage target.

The present disclosure is not to be limited in terms of the particular embodiments described in this application, which are intended as illustrations of various aspects. Many modifications and variations can be made without departing from its scope. Functionally equivalent methods and apparatuses within the scope of the disclosure, in addition to those enumerated, will be apparent to those skilled in the art from the foregoing descriptions. Such modifications and variations are intended to fall within the scope of the appended claims. The present disclosure is to be limited only by the terms of the appended claims, along with the full scope of equivalents to which such claims are entitled. It is also to be understood that the terminology used in this disclosure is for the purpose of describing particular embodiments only, and is not intended to be limiting.

This disclosure may sometimes illustrate different components contained within, or connected with, different other components. Such depicted architectures are merely exemplary, and many other architectures can be implemented which achieve the same or similar functionality.

Aspects of the present disclosure may be embodied in other forms without departing from its spirit or essential characteristics. The described aspects are to be considered in all respects illustrative and not restrictive. The claimed subject matter is indicated by the appended claims rather than by the foregoing description. All changes which come within the meaning and range of equivalency of the claims are to be embraced within their scope.

The invention claimed is:

1. A method for performing data striping, the method comprising:
   obtaining, in a network interface controller (NIC) from a host processor, a command to store data in a storage system, wherein the host processor is connected to a network through the NIC;
   dividing, by the NIC, the data into a plurality of portions;
   mapping, by the NIC, each of the plurality of portions to at least one of a plurality of storage targets, wherein the plurality of storage targets are connected to the NIC over the network;
   transferring, by the NIC, each of the plurality of portions to the mapped at least one storage target; and
   in case one of the plurality of storage targets fails, reconstructing lost data transparently from the host processor.

2. The method of claim 1, wherein the NIC communicates with the plurality of storage targets over multiple paths, and wherein each of the paths is selected from the list consisting of: non-volatile memory express (NVMe) or NVMe over Fabrics (NVMeOF).

3. The method of claim 1, comprising, implementing, by the NIC, data protection mechanism on the stored data.

4. The method of claim 1, wherein reconstructing the lost data is performed when storage target cannot be accessed.

5. The method of claim 1, wherein reconstructing the lost data comprises:
reading, by the NIC, data that is required for the reconstruction from other storage targets of the plurality of storage targets;
reconstructing the lost data using the read data; and
transferring, by the NIC, the reconstructed data to the host processor.

6. The method of claim 1, wherein reconstructing the lost data comprises:
sending, by the NIC, a read-reconstruct command to a selected storage target of the plurality of storage targets;
reading, by the selected storage target, data that is required for the reconstruction from other storage targets of the plurality of storage targets;
reconstructing, by the selected storage target, the lost data using the read data;
transferring, by the selected storage target, the reconstructed data to the NIC; and
transferring, by the NIC, the reconstructed data to the host.

7. The method of claim 1, comprising:
notifying, by the NIC, a management software of the failed storage target;
obtaining, by the NIC, from the management software an allocation of a new storage target;
reconstructing data of the failed storage target on the new storage target; and
continuing using the new storage target instead of the failed storage target.

8. The method of claim 7, wherein reconstructing data of the failed storage target on the new storage target is performed by the NIC.

9. The method of claim 7, wherein reconstructing data of the failed storage target on the new storage target is performed by:
sending, by the NIC, a rebuild command to a selected storage target of the plurality of storage targets;
reconstructing data of the failed storage target on the new storage target by the selected storage target; and
notifying the NIC, by the selected storage target, that the data is reconstructed on the new storage target.

10. A method for performing data striping, the method comprising:
obtaining, in a network interface controller (NIC) from a host processor, a command to store data in a storage system, wherein the host processor is connected to a network through the NIC;
dividing, by the NIC, the data into a plurality of portions;
mapping, by the NIC, each of the plurality of portions to at least one of a plurality of storage targets, wherein the plurality of storage targets are connected to the NIC over the network;
transferring, by the NIC, each of the plurality of portions to the mapped at least one storage target;
obtaining, by the NIC, a read command from the host processor;
retrieving, by the NIC, the portions from the plurality of storage targets; and
transferring the portions to the host processor.

11. A network interface controller (NIC) comprising:
a memory;
a logic design configured to:
connect a host processor to a network;
obtain from the host processor, a read or a write command;
wherein if the command is a write command, the logic design is configured to:
divide the data into a plurality of portions;
map each of the plurality of portions to at least one of a plurality of storage targets, wherein the plurality of storage targets are connected to the NIC over the network; and,
transfer each of the plurality of portions to the mapped at least one storage target, and
if the command is a read command, the logic design is configured to:
read the portions from the plurality of storage targets; and
transfer the portions to the host processor.

12. The NIC of claim 11, wherein the logic design is configured to communicate with the plurality of storage targets over multiple paths, and wherein each of the paths is selected from the list consisting of: non-volatile memory express (NVMe) or NVMe over Fabrics (NVMeOF).

13. The NIC of claim 11, the logic design is configured to implement data protection mechanism on the stored data.

14. The NIC of claim 11, the logic design is configured to, in case one of the plurality of storage targets fails, reconstruct lost data transparently from the host processor.

15. The NIC of claim 14, wherein the logic design is configured to reconstruct the lost data when storage target cannot be accessed.

16. The NIC of claim 14, wherein the logic design is configured to reconstruct the lost data by:
reading data that is required for the reconstruction from other storage targets of the plurality of storage targets;
reconstructing the lost data using the read data; and
transferring the reconstructed data to the host processor.

17. The NIC of claim 14, wherein the logic design is configured to reconstruct the lost data by:
sending, by the NIC, a read-reconstruct command to a selected storage target of the plurality of storage targets;
reading, by the selected storage target, data that is required for the reconstruction from other storage targets of the plurality of storage targets;
reconstructing, by the selected storage target, the lost data using the read data;
transferring, by the selected storage target, the reconstructed data to the NIC; and
transferring, by the NIC, the reconstructed data to the host.

18. The NIC of claim 14, the logic design is configured to:
notify a management software of the failed storage target;
obtain from the management software an allocation of a new storage target;
reconstruct data of the failed storage target on the new storage target; and
continue using the new storage target instead of the failed storage target.

19. The NIC of claim 18, wherein the logic design is configured to reconstruct data of the failed storage target on the new storage target is by:
sending, a rebuild command to a selected storage target of the plurality of storage targets;
wherein the selected storage target is configured to:
reconstruct data of the failed storage target on the new storage target; and notify the NIC that the data is reconstructed on the new storage target.

* * * * *